United States Patent Office 3,558,433
Patented Jan. 26, 1971

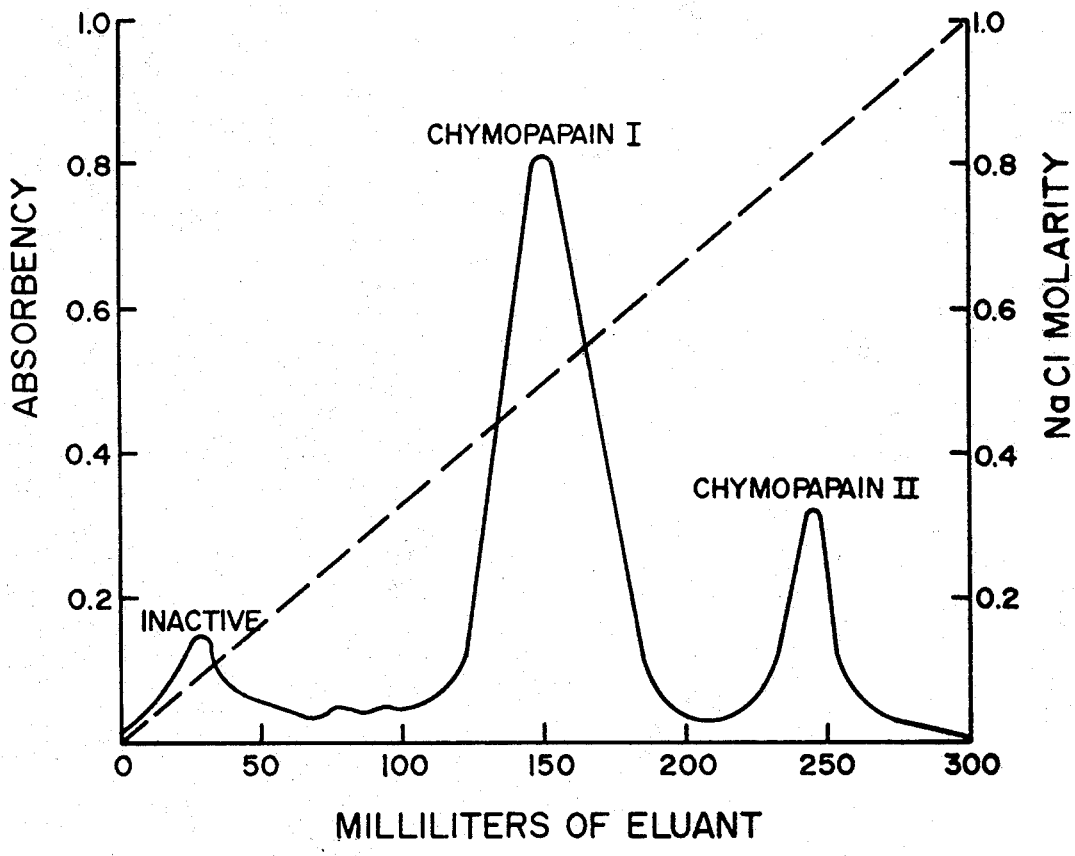

3,558,433
PROCESS FOR PURIFICATION OF CHYMOPAPAIN
Ivan J. Stern, Morton Grove, Ill., assignor to Baxter Laboratories, Inc., Morton Grove, Ill., a corporation of Delaware
Filed Nov. 7, 1967, Ser. No. 681,200
Int. Cl. C07g 7/022
U.S. Cl. 195—66                       7 Claims

ABSTRACT OF THE DISCLOSURE

Process for purifying chymopapain by chromatography of an aqueous extract of crude chymopapain or papaya latex with carboxymethyl substituted cross-linked dextran copolymer equilibrated with aqueous buffer solution followed by eluting with aqueous buffer solution having about the same pH as, but greater ionic strength than, the buffer used for equilibrating the chromatographic column.

---

The present invention relates to the purification of chymopapain and, more particularly, to the preparation of chymopapain of high purity.

Chymopapain is a proteolytic enzyme fraction derived from the tropical plant Carica papaya, and is distinct from papain. It was first described by Jansen and Balls, J. Biol. Chem., vol. 137, pp. 459–60 (1941) and U.S. Pat. 2,313,875.

The Jansen and Balls method for the preparation of chymopapain is essentially a salting-out procedure which consists of acidifying the undried latex of papaya to a pH of about 2, precipitating and separating the inert protein fraction from the liquid phase, and then saturating the retained liquid phase with sodium chloride at a pH of about 2 to precipitate chymopapain.

Other researchers in the field have reported that the application of the Jansen and Balls procedure to commercial papaya latex does not produce a single, crystalline protein as described by Jansen and Balls. Cayle and Lopez-Ramos, Abstracts of Papers of the 140th Meeting of the Am. Chem. Soc'y, Chicago, p. 19C (1961); Ebata and Yasunobu, J. Biol. Chem., vol. 237, pp. 1086–94 (1962); Kunimitsu and Yasunobu, Biochim. Biophys. Acta, vol. 139, pp. 405–17 (1967). Chymopapain separated from papaya by salt fractionation, and/or solvent fractionation, and /or pH adjustment and/or similar methods is hereinafter referred to as crude chymopapain.

Various methods have been heretofore applied to separate two proteolytic components of crude chymopapain, referred to as "chymopapain A" and "chymopapain B." Previously known chromatographic purification procedures have involved the use of "Amberlite" cation exchange resins, "Sephadex" cross-linked dextran gel filtration media, and carboxymethyl cellulose and diethylaminoethyl cellulose adsorbents. However, in these purification methods it has been reported necessary to employ multi-column chromatographic techniques (use of two or more different column media) and to combine the chromatographic purification procedure with a subsequent salting-out procedure in order to obtain a chymopapain fraction of high purity. A major disadvantage of these prior art methods has been a very low recovery or yield of chymopapain.

It is an object of the present invention to provide a process for the purification of chymopapain.

It is another object of the present invention to provide a method for the preparation of chymopapain of high purity.

It is still another object of this invention to provide a simplified and rapid procedure for the purification of chymopapain with a single chromatographic column and without the need of any salting-out procedure.

It is a further object of this invention to provide a convenient process for the preparation of chymopapain of high purity and in high yield by the single column chromatographic purification of crude chymopapain or papaya latex.

Other objects and advantages of the present invention will be apparent to the person skilled in the art after reading the specification and claims appended hereto.

The process of this invention and its advantages can be more readily understood by reference to the annexed drawing. In this drawing:

The figure illustrates the fractionation curve obtained by the process of this invention.

In brief, the present process for the purification of chymopapain comprises the application of an aqueous extract of crude chymopapain or papaya latex to a chromatographic column of carboxymethyl substituted cross-linked dextran copolymer which was previously equilibrated with aqueous buffer solution. The chymopapain is retained on the carboxymethyl substituted cross-linked dextran copolymer and then selectively eluted by passing through the column aqueous buffer solution having about the same pH as, but greater ionic strength than, the buffer used for equilibrating the chromatographic column.

The carboxymethyl substituted cross-linked dextran copolymer used in this invention is a cationic derivative of dextran in which from about 6% to about 50% of the free hydroxyl groups of the cross-linked dextran copolymer has been substituted by carboxymethyl groups. The cross-linked dextran copolymer has a three dimensional network of polysaccharide chains having gel filtration properties and can be prepared, for example, by reacting dextran with epichlorohydrin in the presence of alkaline catalyst as described in U.S. Pats. 3,002,823, 3,042,677 and 3,208,994. The dextran used in this copolymer is an anhydroglucose polymer which is generally produced by numerous strains of Leuconostoc and closely related bacteria in sucrose-containing solutions. The copolymer generally has a molecular weight of from about 5,000 to about 100,000 and generally contains from about 10% to abolt 35% free hydroxyl groups. According to the present invention, from about 6% to about 50% of these free hydroxyl groups are substituted by carboxymethyl groups. This substitution can be carried out, for example, by reaction of the cross-linked dextran copolymer with a chloro- or bromoacetic acid in the presence of water and alkaline catalyst as described in U.S. Pat. 3,275,576. A preferred product for use in this invention is commercially available under the trademark "Sephadex" CM–50 from Pharmacia Fine Chemicals, Uppsala, Sweden.

The carboxymethyl substituted cross-linked dextran copolymer is generally available in bead form. The beads are prepared for use by being allowed to swell in water followed by successive treatment with dilute acid, dilute alkali and then dilute acid, for example, with 0.5 normal HCl, 0.5 N NaOH and then 0.5 N HCl. The copolymer is then washed with water and subsequently equilibrated with the buffer to be employed in the fractionation. A chromatographic column is prepared with the equilibrated carboxymethyl substituted cross-linked dextran copolymer suspension, such that the final height to width ratio is approximately 10 to 1, although other height to width ratios can be used, for example, from about 5 to 1 to about 100 to 1. The bed volume should be such that substantially all of the protein to be applied will be retained on the column, with sufficient free carboxymethyl substituted cross-linked dextran copolymer remaining to effect good separation of components during passage through the column. The column form of the carboxymethyl substituted cross-linked dextran copolymer is essential in the practice of the present invention to make substantially complete use of both the gel filtration and ion-exchange properties of this material. Because of the reversible nature of both of these properties, a batch technique such as described, for example, in U.S. Pat. 3,281,331 for the separation of various other proteins, does not result in satisfactory separation of the high purity chymopapain of this invention.

Crude chymopapain or papaya latex to be purified preferably is placed in a small volume of the buffer to which the column is equilibrated, and insoluble material is removed by centrifugation. The solution is allowed to run onto the column, and subsequently the column, to which the proteins to be purified have adsorbed, is washed with a small additional amount of buffer. To elute selectively the adsorbed proteins, buffer in which suitable metal salts have been dissolved is passed through the column. The elution of the pure protein components occurs as the concentration of salts in the buffer is increased. Protein in the eluate may be detected by any convenient means such as, for example, ultraviolet spectrophotometry or reaction with biuret reagent. Fractions of one or more ml. are collected, depending on the size of the column, and elution is continued with increasing concentration of suitable metal salts until no additional protein is detected. A fraction diagram is prepared as in the FIG. 1. Essentially pure chymopapains I and II are isolated by conventional means such as, for example, dialysis and lyophilization of the fractions which constitute the second and third components, respectively. The first peak which contains most of the colored components has little proteolytic activity, but may contain lysozyme when extracts of crude papaya latex are placed on the column.

In the practice of the present invention it is desirable that the carboxymethyl substituted cross-linked dextran copolymer be equilibrated with an aqueous buffer solution having about the same pH as the solution used to elute the chymopapain retained on the chromatographic column. The pH of the buffer should be in the range of from about 5 to about 8.5. Suitable buffers for this purpose are, for example, phosphate, acetate, citrate, borate and tris (hydroxymethyl) aminomethane buffers. The buffer can also contain a minor amount of ethylenediamine tetraacetic acid, if desired, for example about 0.001 molar.

The eluting solution should have greater ionic strength than that of the buffer solution used for equilibrating the chromatographic column. Suitable ionic activity for elution is provided by employing an aqueous buffered solution of a water-soluble salt of a mono- or divalent metal ion or of a nitrogenous base, for example, sodium chloride, potassium chloride, ammonium chloride, ammonium carbonate, calcium acetate, and the like water-soluble salts of sodium, potassium, lithium, ammonium, calcium and magnesium. It is preferred to increase the ionic strength of the eluting solution by increasing the concentration of the water-soluble salt of mono- or divalent metal ion or nitrogenous base from 0 to 1 normal during the elution.

A principal advantage of the process defined herein is that only a single column technique need be employed, whereas two columns are required in the prior art. Moreover, the large capacity of the carboxymethyl substituted cross-linked dextran copolymer relative to the capacity of carboxymethyl cellulose or unsubstituted cross-linked dextran copolymer makes the process suitable for large scale production. Furthermore, salting-out and its additional dialysis is avoided, and the overall recovery of enzyme is superior to prior art techniques.

In the prior art, for example, the use of two columns and various salting-out procedures (Ebata and Yasunobu, J. Biol. Chem., supra, and Kunimitsu and Yasunobu, Biochim. Biophys. Acta, supra) resulted in a 42% loss of specific activity and recovery of overall activity of only about 5%. In the procedure herein described, the specific activity of the product is greater than that of the starting material, and the overall yield is higher than about 70%.

The criteria by which chymopapain purified by the process described herein is judged to be of high purity are those criteria generally used in protein chemistry. Standard tests applied to small organic molecules are not applicable since proteins are easily decomposed on heating; thus, melting points, for example, are not applicable. Crystallization, as another example, alone is not a sufficient criterion of purity, since many proteins form mixed crystals. Among several methods frequently used for demonstrating impurities in proteins and applied to the chymopapain purified by the process herein are:

Ultracentrifugation.—The protein in solution is subjected to a very high centrifugal force field in the analytical centrifuge. The rate of sedimentation of a given protein depends on its charge, shape, molecular weight, and interaction with the solvent. For a pure protein, a single, symmetrical sedimenting boundary, analyzed by a Schlieren detection system, is observed. Pickels, Ultracentrifugation, in Methods in Medical Research, vol. 5, p. 107 et. seq., The Year Book Publishers, Inc., Chicago, Ill. (1952).

Immunodiffusion.—The protein is injected into an animal to induce the formation of antibody. It is known that antibodies are formed against each specific type of protein injected. When the specific protein is combined in the proper dilution with a proper dilution of antiserum a precipitate is formed. By allowing the antiserum and specific protein antigen (in solution) to diffuse toward each other in an agar gel, a zone of precipitation is formed at the proper concentration of antibody and antigen. A single protein produces a single precipitation line. Oudin, Specific Precipitation in Gels and Its Application to Immunochemical Analysis, in Methods in Medical Research, Id. at p. 335 et. seq.

Electrophoresis.—The protein in solution is placed on a membrane of cellulose acetate which is impregnated with buffer of a given pH. According to their net charge, the protein molecules move when an electric current is passed through the membrane. Since the rate and direction of movement is dependent on the net charge as well as on adsorptive forces between the cellulose acetate and the protein, different proteins form different zones, as detected by specific protein dyes. Nerenberg, Electrophoresis, pp. 5–7, 72–73, F. A. David Co., Philadelphia, Pa. (1966).

The high purity of the chymopapain prepared by the process of this invention has been shown by the following:

(a) Formation of a single, symmetrical boundary in the analytical ultracentrifuge.

(b) Production of a single precipitin zone in agar gel diffusion.

(c) Formation of single protein zones after electrophoresis on cellulose acetate.

The identity of the chymopapain purified by the process of this invention was shown by the following:

(a) Electrophoretic migration rates of the isolated components correspond to those of the crude chymopapain components.

(b) Antiserum to the separated chymopapains show identity reactions in immunodiffusion with crude chymopapain.

The chymopapain purified according to the process defined herein is useful in various pharmaceutical applications, for example, the treatment of herniated intervertebral discs as described in U.S. Pat. 3,320,131, and the acceleration of the post crysosurgical healing process as described in copending application Ser. No. 542,218, filed Apr. 13, 1966, now abandoned. Other uses will be apparent to those skilled in the art.

The following examples will further illustrate the present invention although the invention is not limited to these specific examples. All parts and percentages herein are on a weight basis unless otherwise specified.

EXAMPLE 1

Ten grams of carboxymethyl substituted cross-linked dextan copolymer in the acid form ("Sephadex" CM-50) are suspended in two liters of distilled water and after the major part has settled the fines are decanted. The polymer is cycled successively with 500 ml. each of 0.5 N NaOH, water, 0.5 N HCl, and water. This cycling process is repeated once, and after the last acid treatment and water wash the polymer is equilibrated with 0.05 M tris buffer [tris (hydroxymethyl) aminomethane], pH 8.0, and poured into a chromatography tube to form a column two cm. in diameter and 20 cm. high. Several hundred ml. of tris buffer are run through the column to ensure complete equilibration, and the buffer addition is continued until about 0.5 cm. at the top of the column is drained free of buffer.

Crude chymopapain (four grams) is dissolved in 20 ml. of tris buffer. Insoluble material is removed by centrifugation, and the clear solution is added slowly to the top of the column while more buffer is drained from the bottom. When all of the enzyme solution has been added, about 10 ml. of tris buffer is drained into the column to complete the washing of enzyme into the column. About one cm. of liquid is allowed to remain over the top of the polymer.

To elute the chymopapain components, 200 ml. of 0.05 M, pH 8.0, tris buffer is made 1.0 M with respect to NaCl (solution 1). Solution 1 is placed in a straight sided container which is connected by a siphon to another similar vessel equipped with a stirrer and containing 200 ml. of 0.05 M, pH 8.0, tris buffer (solution 2). Another siphon is arranged to transfer the liquid of solution 2 into the top of the chromatographic column by gravity in such a manner as to give a flow rate of about 20 ml. per hour.

The procedure described above applies to the column a gradient of NaCl in buffer which increases in a linear relationship with volume. Other methods of increasing the NaCl concentration in the buffer can be used in place of this procedure to produce substantially equivalent results.

Fractions of 5 ml. of effluent are collected with the column of the size described above. The entire fractionation is performed at about 25° C. To analyze each fraction for protein, 0.025 ml. are diluted in 3.0 ml. of water and the absorbancy is determined in an ultraviolet spectrophotometer at 280 m$\mu$. A fraction diagram as in FIG. 1 of the drawing is prepared to locate the major portions of protein, and fractions containing the major part of each protein component are combined, dialyzed against distilled water and lyophilized.

In a typical processing of four grams of crude chymopapain according to the procedure of this example, the recovered product consisted of 0.170 gram of inactive, colored protein, 2.250 grams of chymopapain I, and 0.430 grams of chymopapain II. The specific activities of chymopapains I and II were 119% and 111% of the crude chymopapain. Of 94,000 casein digestion units of crude chymopapain added to the column, 67% were recovered as chymopapain I, and 12.5% were recovered as chymopapain II. Total recovery in terms of activity was thus 79%. FIG. 1 of the drawing sets forth the fraction diagram for this example. The high purity and identity of the chymopapain purified by the process of this example was also confirmed by ultracentrifugation, immunodiffusion and electrophoresis as hereinbefore described.

In the above example, potassium chloride, ammonium carbonate and calcium acetate can be substituted for an equivalent amount of sodium chloride to produce substantially equivalent results. Papaya latex can also be used as the starting material for fractionation in the above example in place of crude chymopapain to produce substantially similar chymopapain of high purity and in high yield.

Various modifications and adaptations of the foregoing examples can be devised by the person skilled in the art after reading the foregoing specification and the claims appended hereto without departing from the spirit and scope of the invention. All such modifications and adaptations are included within the scope of the invention.

What is claimed is:

1. A process for the purification of chymopapain comprising:
    (a) contacting an aqueous solution of crude chymopapain or papaya latex with a column of carboxymethyl substituted cross-linked dextran copolymer having three-dimensional networks of polysaccharide chains prepared by reacting dextrain with epichlorohydrin in the presence of alkaline catalyst, said carboxymethyl groups being substituted at from about 6% to about 50% of the free hydroxyl groups of said cross-linked dextran copolymer, and said carboxymethyl substituted cross-linked dextrain copolymer equilibrated with an aqeuous buffer solution having a pH of from about 8 to about 8.5,
    (b) eluting the chymopapain retained on the column with an aqueous buffer solution having about the same pH as, but greater ionic strength than, the buffer used for equilibrating the carboxymethyl substituted crosslinked dextran copolymer, and
    (c) collecting the fractions containing the purified chymopapain.

2. The process of claim 1 in which the aqueous solution of crude chymopapain or papaya latex is buffered to about the same pH as that of the buffer used for equilibrating the carboxymethyl substituted cross-linked dextran.

3. The process of claim 1 in which the ionic strength of the eluting solution is increased by increasing the concentration of a water-soluble salt of a mono- or divalent metal ion or of a nitrogenous base in the eluting solution of from about 0 to about 1 normal during the elution.

4. The process of claim 3 in which the water-soluble salt is sodium chloride.

5. The process of claim 1 in which the aqueous solution of crude chymopapain or papaya latex is buffered to about the same pH as that of the buffer used for equilibrating the carboxymethyl substituted cross-linked dextran and the ionic strength of the eluting solution is increased by increasing the concentration of the water-soluble salt in the eluting solution from about 0 to about 1 normal during the elution.

6. The process of claim 5 in which the water-soluble salt is sodium chloride.

7. The process of claim 5 in which the water-soluble salt is sodium chloride and the pH of the buffer is about 8.

References Cited

Messer et al.:Compt. Rend. Trav. Lab. Carlsberg, vol. 35, No. 1, pp. 1–24 (1964).

Schack: Compt. Rend. Trav. Lab. Carlsberg, vol. 36, No. 4, pp. 67–83 (1967).

LIONEL M. SHAPIRO, Primary Examiner